US012809234B2

(12) United States Patent
Matsumoto et al.

(10) Patent No.: US 12,809,234 B2
(45) Date of Patent: Nov. 24, 2026

(54) OPTICAL APPARATUS

(71) Applicant: CANON KABUSHIKI KAISHA, Tokyo (JP)

(72) Inventors: Kohei Matsumoto, Chiba (JP); Akira Takaura, Kanagawa (JP); Kanae Nakamori, Kanagawa (JP); Mitsuru Morohashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 18/819,451

(22) Filed: Aug. 29, 2024

(65) Prior Publication Data

US 2025/0093752 A1 Mar. 20, 2025

(30) Foreign Application Priority Data

Sep. 15, 2023 (JP) ................................ 2023-149865
Sep. 21, 2023 (JP) ................................ 2023-154051

(51) Int. Cl.
*G03B 17/14* (2021.01)

(52) U.S. Cl.
CPC .................................... *G03B 17/14* (2013.01)

(58) Field of Classification Search
CPC ...................................................... G03B 17/14
USPC ........................................................ 359/827
See application file for complete search history.

(56) References Cited

U.S. PATENT DOCUMENTS

2005/0047770 A1* 3/2005 Kuchimaru .......... G02B 13/009 396/75
2006/0055812 A1* 3/2006 Takanashi .............. H05K 1/147 348/340
2020/0257132 A1* 8/2020 Im ............................ G02B 7/09
2023/0156334 A1* 5/2023 Jang .......................... H01F 7/20 348/208.7
2023/0171475 A1* 6/2023 Jang ....................... G03B 13/36 348/373
2023/0273397 A1* 8/2023 Kim ......................... G02B 7/02 348/55
2024/0111122 A1* 4/2024 Kondo .................. G02B 7/023

FOREIGN PATENT DOCUMENTS

JP 2003172863 A 6/2003

* cited by examiner

*Primary Examiner* — William R Alexander
(74) *Attorney, Agent, or Firm* — Cowan, Liebowitz & Latman, P.C.

(57) ABSTRACT

An optical apparatus includes a first substrate having a principal plane orthogonal to an optical axis, and a second substrate having a principal plane parallel to the optical axis. The first substrate and the second substrate are joined together. The first substrate has a first mounting surface, and a second mounting surface opposite to the first mounting surface. The second substrate includes a joined portion joined to the first mounting surface of the first substrate, and a first area extending across the first mounting surface and the second mounting surface in an optical axis direction. The optical apparatus further comprises a first electrical element is disposed in the first area.

18 Claims, 13 Drawing Sheets

SECTION A-A

SECTION A-A

OPTICAL APPARATUS

BACKGROUND

Technical Field

The disclosure relates to an optical apparatus.

Description of Related Art

Along with improvement of functions of an optical apparatus such as an interchangeable lens, including autofocus (AF) and image stabilizing functions, the scale of a control circuit mounted on a substrate inside the optical apparatus increases, and accordingly, the area of the substrate increases. Japanese Patent Laid-open No. 2003-172863 discloses an electrical substrate mounting structure including at least one hard substrate approximately orthogonal to an optical axis, at least one hard substrate approximately parallel to the optical axis, and a board-to-board connector connecting both hard substrates.

The structure disclosed in Japanese Patent Laid-open No. 2003-172863 cannot dispose the electrical substrate with spatial efficiency, and thus has difficulty in downsizing the optical apparatus.

Relatively large-sized electrical elements such as an LC filter and an actuator step-up coil are sometimes mounted on a substrate that is used in an optical apparatus. FIG. 13 is a perspective view illustrating an example of an electrical substrate (substrate) in an optical apparatus according to a comparative example. On a substrate 900, an electrical element 910 is disposed on an object side (upper side in FIG. 13) in a direction (optical axis direction) along an optical axis O. With such a structure, the overall lens length of the optical apparatus increase as the height of the electrical element 910 in the optical axis direction becomes higher.

SUMMARY

An optical apparatus according to one aspect of the disclosure includes a first substrate having a principal plane orthogonal to an optical axis, and a second substrate having a principal plane parallel to the optical axis. The first substrate and the second substrate are joined together. The first substrate has a first mounting surface, and a second mounting surface opposite to the first mounting surface. The second substrate includes a joined portion joined to the first mounting surface of the first substrate, and a first area extending across the first mounting surface and the second mounting surface in an optical axis direction. The optical apparatus further comprises a first electrical element is disposed in the first area.

An optical apparatus according to another aspect of the disclosure includes a first substrate having a principal plane orthogonal to an optical axis, and a second substrate having a principal plane parallel to the optical axis. The first substrate and the second substrate are joined together. The first substrate has a first mounting surface, and a second mounting surface opposite the first mounting surface. The second substrate includes an end portion facing the first mounting surface of the first substrate. The end portion includes a joined portion joined to the first mounting surface, and a cutout portion that forms space with the first mounting surface.

Further features of the disclosure will become apparent from the following description of embodiments with reference to the attached drawings.

DETAILED DESCRIPTION

Figure 1A:
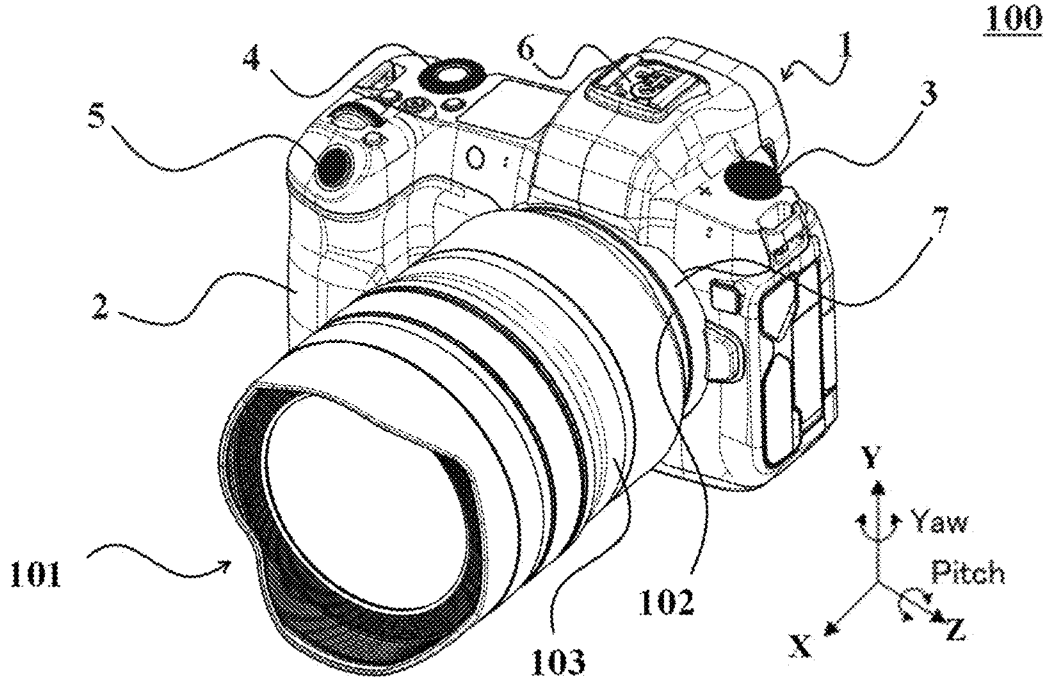
FIGS. 1A and 1B are exterior diagrams of an image pickup system according to each embodiment.

Embodiments of the present disclosure will be described below in detail with reference to the accompanying drawings. In each of the drawings, the same elements will be denoted by the same reference numerals and the duplicate descriptions thereof will be omitted. The following description of each embodiment will be made on an interchangeable lens (lens apparatus) as an example of an optical apparatus, but the embodiment is not limited to it and is also applicable to any other optical apparatus such as a lens integrated type camera.

First Embodiment

Referring now to FIGS. 1A to 8B, a description will be given of a first embodiment of the present disclosure. FIGS. 1A and 1B are exterior diagrams of an image pickup system (camera system) 100 according to the first embodiment, illustrating perspective views from a front surface side and a back surface side, respectively. The image pickup system 100 includes a camera body (digital camera or image pickup apparatus) 1 and an interchangeable lens (lens apparatus or optical apparatus) 101 attachable to and detachable from the camera body 1.

As illustrated in FIG. 1A, an X-axis direction is set to an optical axis direction in which the optical axis of an imaging optical system housed in an interchangeable lens 101 extends, and a Z-axis direction (horizontal direction) and a Y-axis direction (vertical direction) are set to two directions orthogonal to the optical axis and orthogonal to each other. Hereinafter, the Z-axis direction and the Y-axis direction are also collectively referred to as a Z/Y-axis directions. In addition, a pitch direction is set to a rotational direction about the Z-axis, and a yaw direction is set to a rotational direction about the Y-axis. The pitch direction and the yaw direction (pitch/yaw directions) are rotational directions about two axes along the Z and Y-axes orthogonal to each other.

A grip portion 2 for a user to grasp the camera body 1 with a hand is provided at a part of the camera body 1 on the left side when viewed from a front side (object side) (on the right side when viewed in a back side). A power-source operation unit 3 is disposed at a top surface portion of the camera body 1. The camera body 1 is powered on and becomes ready for imaging when the user operates the power-source operation unit 3 to power on while the camera body 1 is powered off. The camera body 1 is powered off when the user operates the power-source operation unit 3 to power off while the camera body 1 is powered on.

A mode dial 4, a release button 5, and an accessory shoe 6 are provided at the top surface portion of the camera body 1. Imaging modes can be switched as the user rotationally operates the mode dial 4. The imaging modes include a manual still image capturing mode in which the user can optionally set an imaging condition such as a shutter speed and an aperture value (F-number), an automatic still image capturing mode in which a proper exposure amount is automatically determined, and a moving image capturing mode for moving image capturing. The user can instruct an imaging preparation operation such as AF or auto-exposure (AE) control by half-pressing the release button 5 and can instruct imaging by fully pressing the release button 5. An unillustrated accessory such as an external flash or an external finder (electronic viewfinder: EVF) is detachably mounted on the accessory shoe 6. In addition, an image sensor configured to photoelectrically convert (capture) an object image formed through the imaging optical system in the interchangeable lens 101 is provided in the camera body 1.

The interchangeable lens 101 is mechanically and electrically connected (connectable) to a camera mount 7 provided at the camera body 1 through a lens mount (mount unit) 102. As described above, the imaging optical system configured to form an object image by imaging light from an object is housed in the interchangeable lens 101. A zoom operation ring 103 that is rotatable about the optical axis by a user operation is provided at the outer periphery of the interchangeable lens 101. An outer peripheral part of the zoom operation ring 103 is provided with a knurled pattern to prevent slide of the hand when the user operates. When the zoom operation ring 103 is rotationally operated by the user, a zoom unit constituting the imaging optical system moves to a predetermined optical position corresponding to the angle of the zoom operation ring 103. Thereby, the user can perform imaging with a desired angle of view.

Figure 1B:
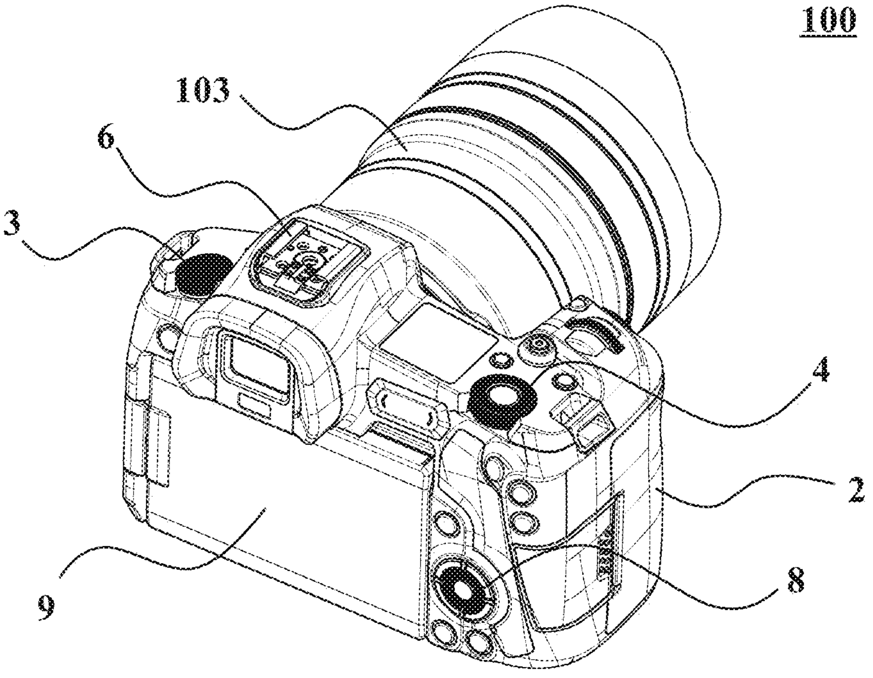

As illustrated in FIG. 1B, a back surface operation unit 8 and a display unit 9 are provided on a back surface of the camera body 1. The back surface operation unit 8 includes a plurality of buttons and dials allocated to a variety of functions. When the camera body 1 is powered on and the still or moving image capturing mode is set, the display unit 9 displays a through-lens image of an object image picked up by the image sensor. The display unit 9 also displays an imaging parameter indicating an imaging condition such as a shutter speed and aperture value (F-number), and the user can change a set value of the imaging parameter by operating the back surface operation unit 8 while viewing the display. The back surface operation unit 8 includes a playback button for instructing playback of a recorded captured image, and the captured image is played back and displayed on the display unit 9 when the user operates the playback button.

Figure 2:
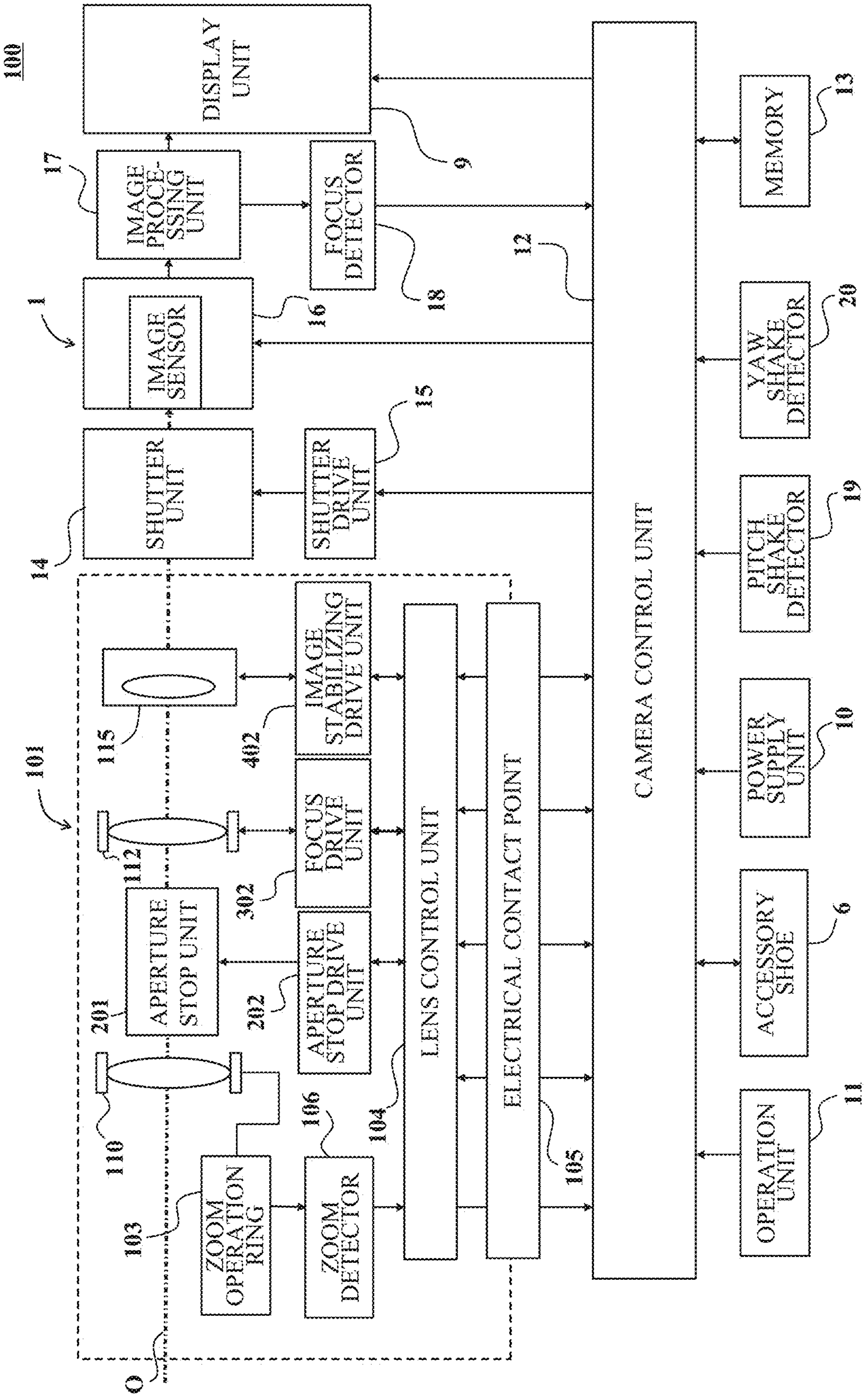
FIG. 2 is a block diagram of the image pickup system according to each embodiment.

FIG. 2 is a block diagram illustrating electrical and optical configurations of the image pickup system 100. The camera body 1 includes a power supply unit 10 configured to supply electrical power to the camera body 1 and the interchangeable lens 101, and also includes the power-source operation unit 3, the mode dial 4, the release button 5, and an operation unit 11 including touch panel functions of the back surface operation unit 8 and the display unit 9. Control of the camera body 1 and the interchangeable lens 101 as the entire system is performed through mutual cooperation between a camera control unit 12 provided at the camera body 1 and a lens control unit 104 provided at the interchangeable lens 101.

The camera control unit 12 reads and executes a computer program stored in a memory 13. At this time, the camera control unit 12 communicates various kinds of control signals, data, and the like with the lens control unit 104 through a communication terminal of an electrical contact 105 provided at a lens mount 102. The electrical contact 105 includes a power source terminal through which electrical power from the above power supply unit 10 is supplied to the interchangeable lens 101.

The imaging optical system of the interchangeable lens 101 includes a zoom unit coupled to the zoom operation ring 103 and configured to move in the optical axis direction to change an angle of view, and an image stabilizing unit 115 including a shift lens as an image stabilizing element configured to reduce image blur. The image stabilizing unit 115 performs image stabilizing operation that reduces image blur by moving (shifting) the shift lens in the Z/Y-axis directions orthogonal to the optical axis O. The imaging optical system also includes an aperture stop unit (aperture stop) 201 configured to perform a light amount adjusting operation, and a focus unit 112 as a moving lens unit including a focus lens configured to move in the optical axis direction for focusing. The interchangeable lens 101 includes an image stabilizing drive unit 402 configured to drive the image stabilizing unit 115 to shift the shift lens, an aperture stop drive unit 202 configured to drive the aperture stop unit 201, and a focus drive unit 302 configured to drive the focus unit 112 to move the focus lens.

The camera body 1 includes a shutter unit 14, a shutter drive unit 15, an image sensor 16, an image processing unit 17, and the camera control unit 12. The shutter unit 14 controls a light amount to be condensed through the imaging optical system in the interchangeable lens 101 and exposed to the image sensor 16. The image sensor 16 includes a complementary metal-oxide-semiconductor (CMOS) sensor or the like, photoelectrically converts an object image (optical image) formed through the imaging optical system, and outputs an imaging signal. The image processing unit 17 performs various kinds of image processing for the imaging signal and then generates an image signal. The display unit 9 displays the image signal (through image or live-view image) output from the image processing unit 17, displays the imaging parameters, or plays back and displays a captured image recorded in the memory 13 or an unillustrated recording medium.

The camera control unit 12 controls drive of the aperture stop unit 201 and the shutter unit 14 through the aperture stop drive unit 202 and the shutter drive unit 15 in accordance with set values of the aperture value and shutter speed received from the operation unit 11. The camera control unit 12 also controls drive of the focus unit 112 in accordance with an imaging preparation operation (half-press operation) through the operation unit 11 (release button 5).

For example, in a case where AF operation is instructed, a focus detector 18 determines a focus state of an object image formed on the image sensor 16 based on an image signal generated by the image processing unit 17, generates a focus signal, and transmits the focus signal to the camera control unit 12. Simultaneously, the focus drive unit 302 detects the current position of the focus unit 112 and transmits a signal thereof to the camera control unit 12 through the lens control unit 104. The camera control unit 12 compares the focus state of the object image and the current position of the focus unit 112, calculates a focus drive amount based on a difference amount between them, and transmits the focus drive amount to the lens control unit 104. Then, the lens control unit 104 controls drive of the focus unit 112 to a target position through the focus drive unit 302, thereby correcting the defocus of the object image.

In a case where AE control operation is instructed, the camera control unit 12 receives a luminance signal generated by the image processing unit 17 and performs photometric (light metering) calculation. The camera control unit 12 controls drive of the aperture stop unit 201 based on a result of the photometric calculation in accordance with an imaging instruction operation (full-press operation) through the operation unit 11 (the release button 5). Along with this, the camera control unit 12 controls drive of the shutter unit 14 through the shutter drive unit 15 and performs exposure processing with the image sensor 16.

The camera body 1 includes a pitch shake detector 19 and a yaw shake detector 20 as shake detectors capable of detecting image blur such as manual shake by the user. The pitch shake detector 19 and the yaw shake detector 20 detect image blur in the pitch direction (rotational direction about the Z-axis) and the yaw direction (rotational direction about the Y-axis), respectively, by using an angular velocity sensor (vibration gyro) or an angular acceleration sensor, and output shake signals. The camera control unit 12 calculates shift position of the image stabilizing unit 115 (shift lens) in the Y-axis direction by using the shake signal from the pitch shake detector 19. Similarly, the camera control unit 12 calculates shift position of the image stabilizing unit 115 in the Z-axis direction by using the shake signal from the yaw shake detector 20. Then, the camera control unit 12 controls drive of the image stabilizing unit 115 to a target position in accordance with the calculated shift positions in the pitch/yaw directions, thereby performing image stabilizing operation that reduces image blur during exposure or through image display.

The interchangeable lens 101 includes the zoom operation ring 103 for changing an angle of view of the imaging optical system, and a zoom detector 106 configured to detect an angle of the zoom operation ring 103. The zoom detector 106 is constituted by using, for example, a resistive linear potentiometer and detects, as an absolute value, the angle of the zoom operation ring 103 being operated by the user. Information on the angle of view detected by the zoom detector 106 is transmitted to the lens control unit 104 and reflected onto various kinds of control by the camera control unit 12. Part of various kinds of information is recorded in the memory 13 or the recording medium together with a captured image.

Figure 3:
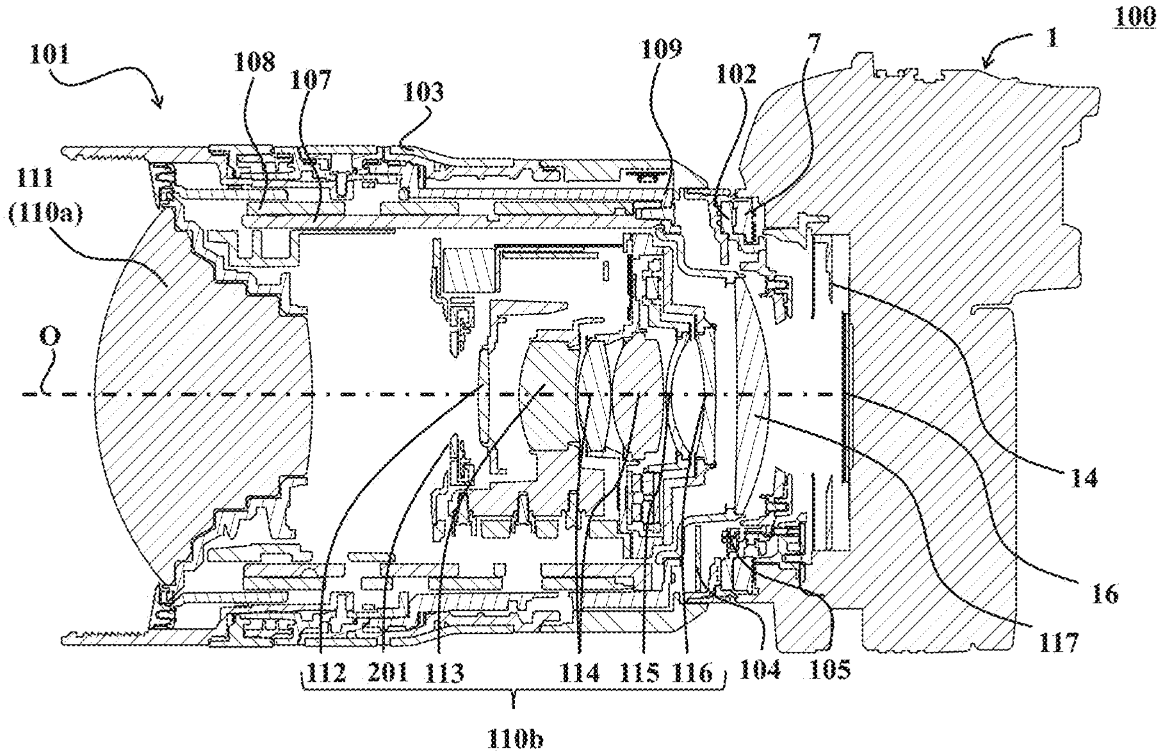
FIG. 3 is a sectional view of the image pickup system according to each embodiment (retracted state).
Figure 4:
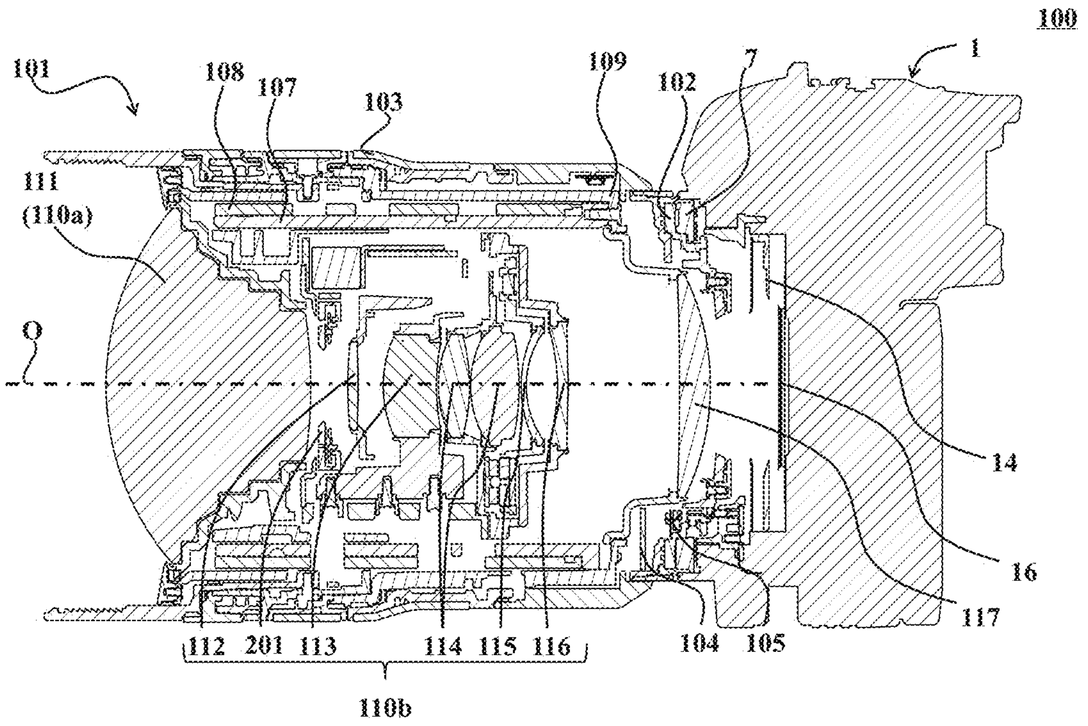
FIG. 4 is a sectional view of the image pickup system according to each embodiment (extended state).

Referring now to FIGS. 3 and 4, a description will be given of a positional relationship among components of the image pickup system 100. FIGS. 3 and 4 are sectional views of the image pickup system 100 on the XY plane including the optical axis, illustrating a zoom retracted state and a zoom extended state, respectively, of the interchangeable lens 101.

This embodiment employs a seven-unit configuration as an example of the imaging optical system. Each zoom unit having moved to a predetermined optical position in accordance with an angle of view images light from the object onto an imaging surface of the image sensor 16. At this time, the focus unit 112 functions as a second zoom unit, and the image stabilizing unit 115 functions as a fifth zoom unit. The imaging optical system also includes a first zoom unit 111, the aperture stop unit 201, a third zoom unit 113, a fourth zoom unit 114, a sixth zoom unit 116, and a seventh fixed unit 117.

The zoom unit of the imaging optical system includes an object-side zoom unit 110*a* and an imaging surface-side zoom unit 110*b*. The object-side zoom unit 110*a* includes the first zoom unit 111. The imaging surface-side zoom unit 110*b* includes the focus unit (second zoom unit) 112, the third zoom unit 113, the fourth zoom unit 114, the image stabilizing unit (fifth zoom unit) 115, the sixth zoom unit 116, and the aperture stop unit 201, which are coupled to each other.

This embodiment does not limit the configuration of lens units, but for example, the image stabilizing unit 115 may function as the third zoom unit. Moreover, a part of lens units may be fixed instead of being movable.

A linear guide barrel 107 is a fixed part that is fixed to a fixed barrel 109 and fixed to the lens mount 102 through the fixed barrel 109. Unillustrated bayonet clicks are arranged at equally spaced positions on the outer circumferential surface of the linear guide barrel 107. A unillustrated circumferential groove is provided on the inner circumferential surface of a cam barrel 108. The cam barrel 108 is coupled to the zoom operation ring 103. As the zoom operation ring 103 is rotationally operated, the cam barrel 108 rotates about the optical axis by engagements between the bayonet clicks and the circumferential groove.

The linear guide barrel 107 is formed with a linear guide groove that regulates movement of each zoom unit in the rotational direction and guides linear movement in the optical axis direction. The cam barrel 108 is formed with cam grooves having loci of mutually different angles in the rotational direction, corresponding to the object-side zoom unit 110*a* and the imaging surface-side zoom unit 110*b*. The object-side zoom unit 110*a* and the imaging surface-side zoom unit 110*b* are each provided with a cam follower, and the cam follower is engaged with the corresponding linear guide groove and the corresponding cam groove. As the user rotationally operates the zoom operation ring 103, the cam barrel 108 rotates and each cam follower moves the corresponding one of the object-side zoom unit 110*a* and the imaging surface-side zoom unit 110*b* along its locus forward and backward in the optical axis direction by engagement with the linear guide groove and the cam groove.

Figure 5:
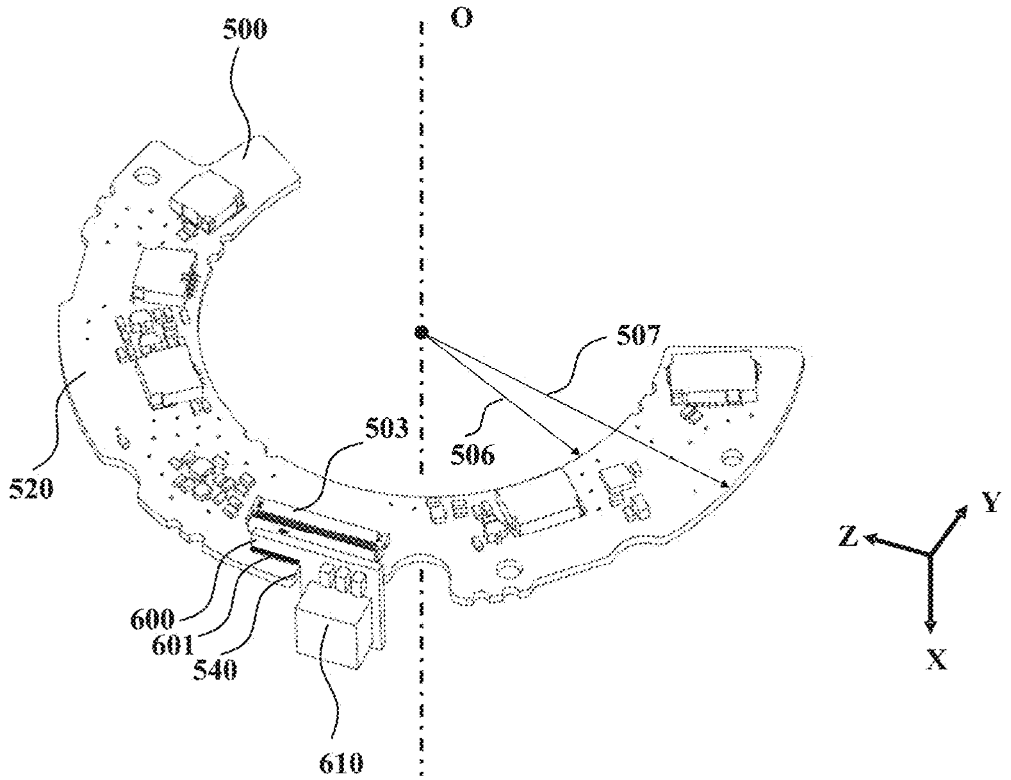
FIG. 5 is a perspective view illustrating a state in which a first substrate and a second substrate are joined together in a first embodiment.

FIG. 5 is a perspective view illustrating a state in which a first substrate 500 and a second substrate 600 are joined together in this embodiment. The first substrate 500 is a substrate having a principal plane approximately orthogonal to the optical axis O. The first substrate 500 is a main substrate for controlling the image stabilizing drive unit 402, the aperture stop drive unit 202, the focus drive unit 302, and the like of the interchangeable lens 101. The first substrate 500 is provided with a microcomputer having basic control functions, drive ICs of various actuators, a connector 503 for connection with another substrate in the interchangeable lens 101, and the like.

The connector 503 is one of a plurality of connectors disposed on the first substrate 500 and is a connector that serves as a connector with an unillustrated flexible printed circuit board. The flexible printed circuit board connected to the connector 503 is connected to the lens mount 102 illustrated in FIG. 4, which is connected to the camera body 1.

The first substrate 500 has an outer shape defined by a first substrate inner diameter 506 that is the inner diameter (minimum inner diameter) of the first substrate 500, and a first substrate outer diameter 507 that is the outer diameter (maximum outer diameter) of the first substrate 500. The first substrate inner diameter 506 and the first substrate outer diameter 507 share the same center (the optical axis O of a lens as an optical element). The first substrate 500 has an arc shape.

The second substrate 600 is a substrate having a principal plane approximately parallel to the optical axis O. The second substrate 600 is a substrate orthogonally joined to the first substrate 500 and assists functions of the first substrate 500. Details of the second substrate 600 will be described later.

An electrical element (first electrical element) 610 is an electrical element such as an LC filter configured to cut or pass a particular frequency band of an electrical signal. In this embodiment, the electrical element 610 has a size of 5.0 mm (D)×5.0 mm (W)×3.0 mm (H). The height of the connector 503 is 1.0 mm approximately, and the height of any other peripheral member is equal to or lower than 1.0 mm.

The electrical element 610 may be an electrical element having other functions, such as a step-up coil for an actuator. In this case, a larger electrical element is employed as the electrical element 610 in some cases to amplify voltage of the actuator.

The first substrate 500 and the second substrate 600 are electrically connected to each other through soldering. Unlike junction through a connector, the soldering can omit space that is occupied by the connector and necessary for mounting the connector. Thus, the size of an optical apparatus such as the interchangeable lens 101 can be reduced. Moreover, unlike junction through a connector, the soldering can directly connect substrates and thus reduce contact resistance due to connection. As a result, the voltage drop can be suppressed.

Electrical elements are disposed on a first mounting surface 520 and a second mounting surface 521 (refer to FIG. 6) of the first substrate 500, the second mounting surface 521 being the back surface of the first mounting surface 520 (opposite the first mounting surface 520). The electrical elements on the first mounting surface 520 are disposed on an image sensor side, and the electrical elements on the second mounting surface 521 are disposed on an object side.

Figure 6:
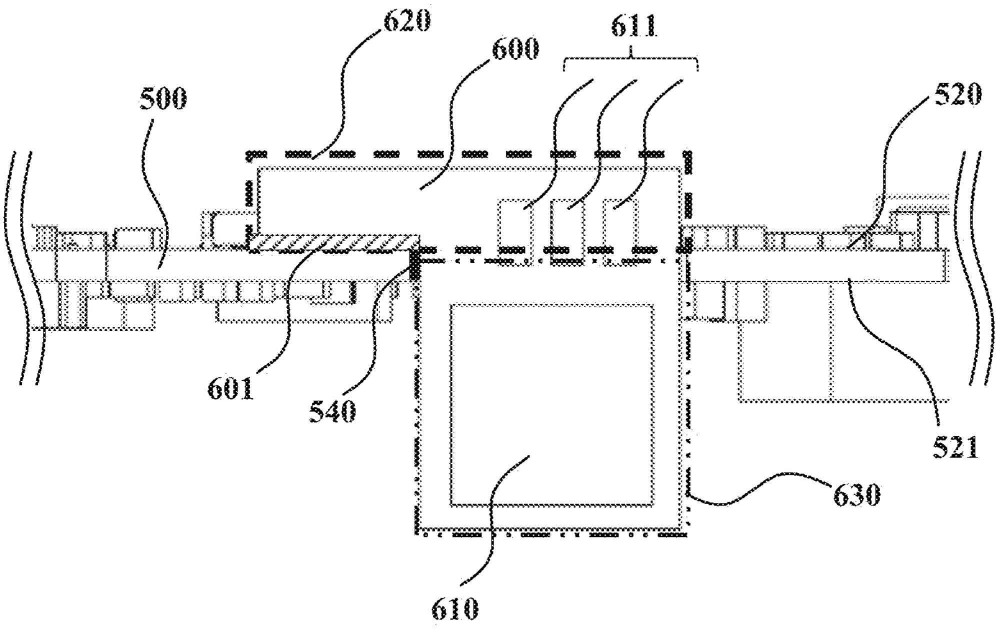
FIG. 6 is a side view illustrating a state in which the first substrate and the second substrate are joined together in the first embodiment.

FIG. 6 is a side view illustrating a state in which the first substrate 500 and the second substrate 600 are joined together in this embodiment (when viewed from an electrical element mounting surface of the second substrate 600). The second substrate 600 includes a joined portion 601 that is joined to the first mounting surface 520 of the first substrate 500. The first substrate 500 and the second substrate 600 are each joined by soldering to the joined portion 601 where an insulating layer is opened and a conductor is exposed.

As illustrated in FIGS. 5 and 6, the joined portion 601 is disposed on each of front and back surfaces on the same surface side as the electrical element 610 of the second substrate 600 and an unillustrated back surface side. The joined portion 601 may be reinforced by a material different from solder, such as a bonding agent. This embodiment illustrates a single joined portion as the joined portion 601, but the present disclosure is not limited to this example. As the joined portion 601, a plurality of joined portions may be provided on the front and back surfaces or at a plurality of different positions.

The second substrate 600 includes a transverse portion (second area) 620 and an extension portion (first area) 630. In the optical axis direction, the extension portion 630 protrudes from the second mounting surface 521 of the first substrate 500, and the transverse portion 620 protrudes from the first mounting surface 520 of the first substrate 500. The extension portion 630 is extended from the joined portion 601 across an end portion (outer shape end portion) 540 of the first substrate 500 in a direction orthogonal to the optical axis O. The transverse portion 620 intersects with the end portion 540 of the first substrate 500 in the direction orthogonal to the optical axis O.

In this embodiment, capacitors (second electrical elements) 611 are disposed at the transverse portion 620. In this case, the capacitors 611 are disposed on the first mounting surface 520 side of the first substrate 500 in the direction (optical axis direction) along the optical axis O. However, this embodiment is not limited to this example, and the capacitors 611 may be disposed in an area on the second substrate 600, the area overlapping the first substrate 500 in the direction orthogonal to the optical axis O.

The extension portion 630 is extended across the optical axis direction from the transverse portion 620 toward the second mounting surface 521 of the first substrate 500. In the structure according to this embodiment, the electrical element 610 is disposed at the extension portion 630. In this case, the electrical element 610 is disposed on the second mounting surface 521 of the first substrate 500 side in the optical axis direction.

In this embodiment, the second substrate 600 has an L-shaped substrate shape but may have another substrate shape including the transverse portion 620 and the extension portion 630.

Figure 7:
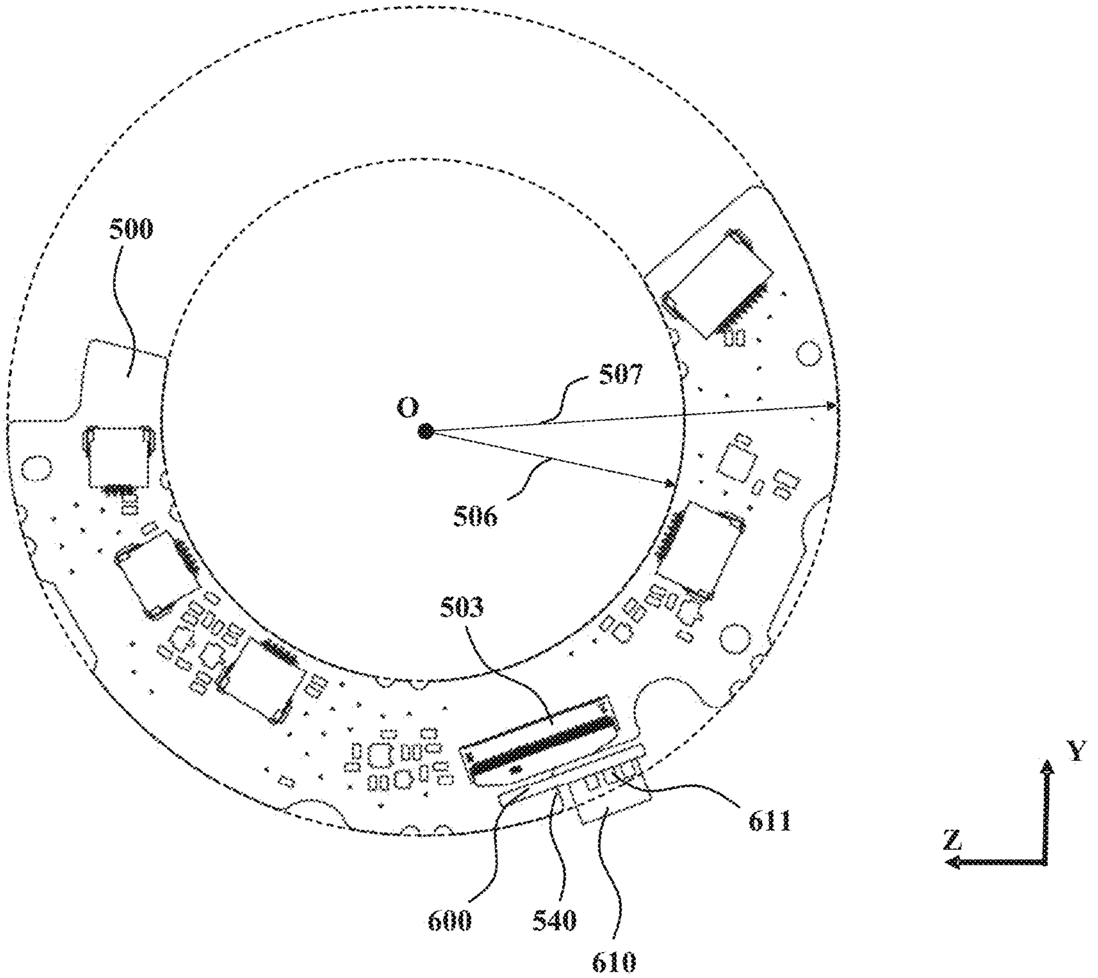
FIG. 7 is a top view illustrating a state in which the first substrate and the second substrate are joined together in the first embodiment.

FIG. 7 is a top view illustrating a state in which the first substrate 500 and the second substrate 600 are joined together in this embodiment (when viewed from an electrical element mounting surface of the first substrate 500). The second substrate 600 is disposed such that the transverse portion 620 of the second substrate 600 is approximately parallel to the longitudinal direction of the connector 503 of the first substrate 500 (the principal plane of the second substrate 600 is approximately parallel to the longitudinal direction of the connector 503). This structure can utilize an area between the connector 503 and the first substrate outer diameter 507 of the first substrate 500 in a case where an unillustrated flexible printed circuit board is inserted into the connector 503 from the first substrate inner diameter 506 side of the first substrate 500. For example, an electrical element constituting a circuit relating to a power circuit is mounted on the second substrate 600. This structure in which the connector 503 and the second substrate 600 are disposed in proximity can reduce an electrical connection path from the lens mount 102 to the electrical element 610, and thereby suppress voltage drop.

Due to the structure of this embodiment, the electrical element 610 can be disposed so that the electrical element 610 does not overlap the first substrate 500 (substrate area between the first mounting surface 520 and the second mounting surface 521) in the optical axis direction. Moreover, due to this embodiment, at least part of the electrical element 610 (upper surface or outermost side of the electrical element 610) can be disposed to protrude outward from the first substrate outer diameter 507 (to a position farther from the optical axis O) when viewed in the optical axis direction (on a projection plane orthogonal to the optical axis O).

As illustrated in FIG. 7, the extension portion 630 and the transverse portion 620 of the second substrate 600 are disposed between the minimum inner diameter and the maximum outer diameter of the first substrate 500, when viewed in the optical axis direction. At least part of the electrical element 610 protrudes outward from the maximum outer diameter of the first substrate 500, when viewed in the optical axis direction. The extension portion 630 of the second substrate 600 extends in an area of the first substrate 500 with an outer diameter smaller than the maximum outer diameter, when viewed in the optical axis direction.

In the conventional structure, in an attempt to mount the electrical element 610 onto the first substrate 500, the mount position of the electrical element 610 is restricted by the substrate shape of the first substrate 500 such as the inner diameter or the outer diameter. Due to the structure according to this embodiment, the electrical element 610 can be disposed in the space inside a lens barrel without influence of the substrate shape of the first substrate 500.

Figure 8A:
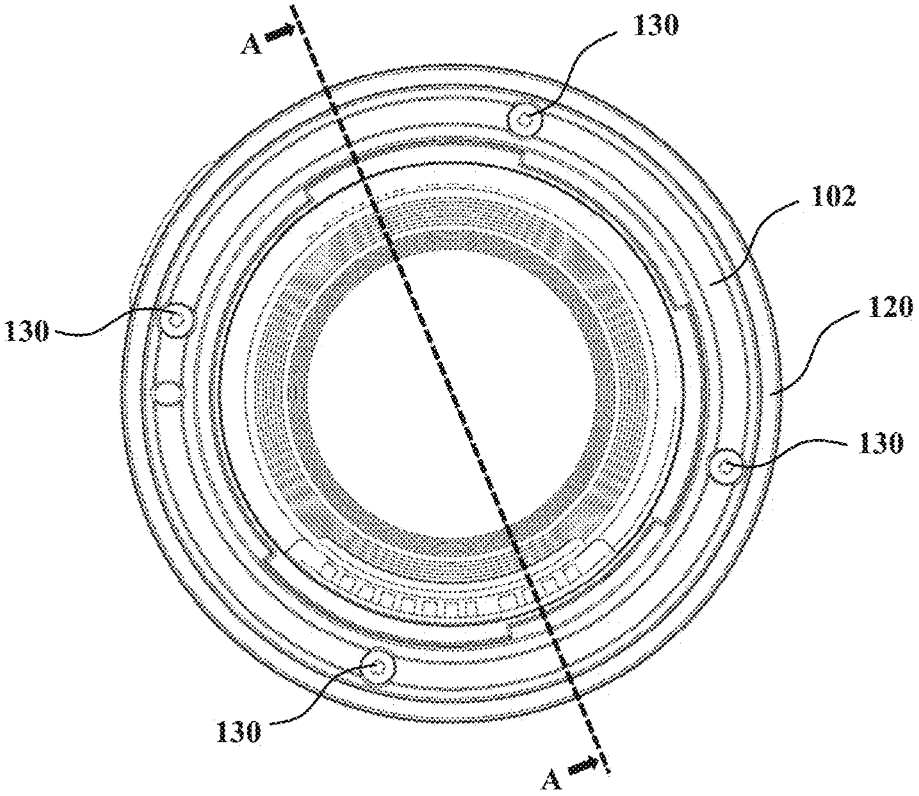
FIG. 8A is a back view of an optical apparatus according to the first embodiment.
Figure 8B:
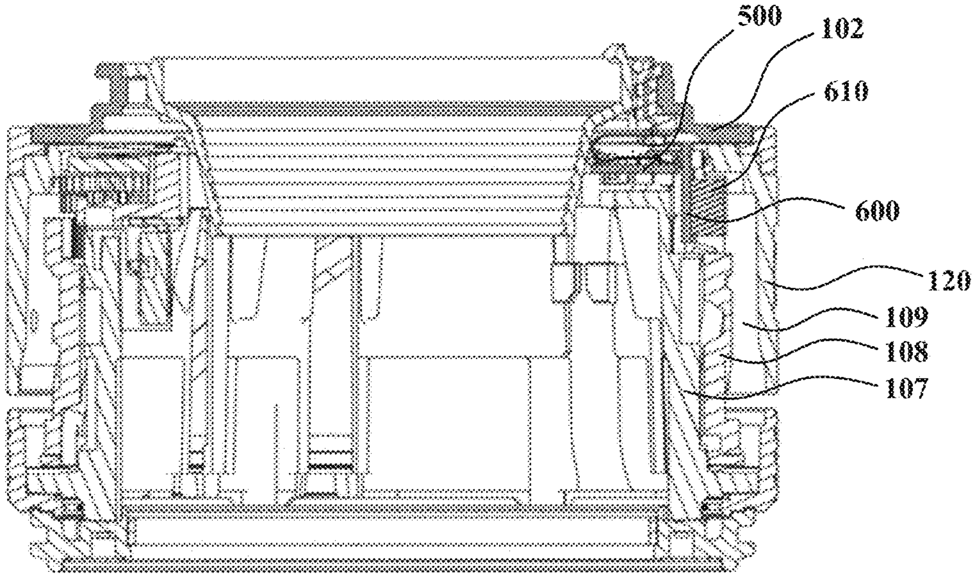
FIG. 8B is a sectional view of the optical apparatus according to the first embodiment.

FIG. 8A is a back view of the interchangeable lens 101 on which the first substrate 500 and the second substrate 600 are mounted in this embodiment. FIG. 8B is a sectional view taken along a line A-A in FIG. 8A. FIG. 8A illustrates the interchangeable lens 101 viewed from the imaging surface side and illustrating the arrangement of the lens mount 102. FIG. 8B illustrates an arrangement state of the first substrate 500 and the second substrate 600 in the interchangeable lens 101.

The lens mount 102 is fixed to an exterior ring 120 that is an exterior portion of the interchangeable lens 101 by a screw 130. The first substrate 500 is disposed directly below the lens mount 102 based on consideration of connection with the camera body 1. In this structure, the transverse portion 620 or the joined portion 601 of the second substrate 600 is disposed between the first mounting surface 520 of the first substrate 500 and the lens mount 102.

The electrical element 610 is disposed in proximity to the exterior ring 120. The conventional structure has a large size so as to avoid interference with the lens barrel inside in disposing the electrical element 610. On the other hand, the arrangement according to this embodiment provide the favorable shapes of lens barrel components and excellent spatial efficiency in substrate disposition. Thus, the structure according to this embodiment can provide a substrate arrangement by maximizing the space between the lens mount 102 and the first substrate 500 and the space inside the exterior ring 120.

Since the electrical element 610 and the capacitors 611 are mounted on the second substrate 600, the structure according to this embodiment can reduce the component disposition space on the first substrate 500 and achieve efficiently arrange components in the space inside the lens barrel. Moreover, the structure according to this embodiment including the transverse portion 620 and the extension portion 630 can utilize not only component disposition area on the first substrate 500 but also areas on the first mounting surface 520 side and the second mounting surface 521 side, and thereby achieve an enlarged component disposition area in the optical axis direction.

In this embodiment, since the second substrate 600 includes the joined portion 601, the transverse portion 620, and the extension portion 630, and the electrical element 610 is disposed at the extension portion 630, the substrate disposition can be achieved with which disposition in the lens barrel is possible with spatial efficiency. Thus, this embodiment can provide a compact optical apparatus. Moreover, since the first substrate 500 and the second substrate 600 are directly electrically connected to each other by soldering, voltage drop can be suppressed.

In this embodiment, the first substrate 500 has an arc shape, but is not limited to this example and may have a different shape, such as a rectangular shape or another shape in which the first substrate inner diameter 506 or the first substrate outer diameter 507 is partially straight. In a case where the first substrate 500 has a rectangular shape, the first substrate 500 may be disposed in the fixed barrel 109 or the like instead of directly below the lens mount 102.

Second Embodiment

Referring now to FIGS. 9 to 12, a description will be given of a second embodiment of the present disclosure. In this embodiment, FIGS. 1 to 4 are common to those of the first embodiment, and thus a description thereof will be omitted.

Figure 9:
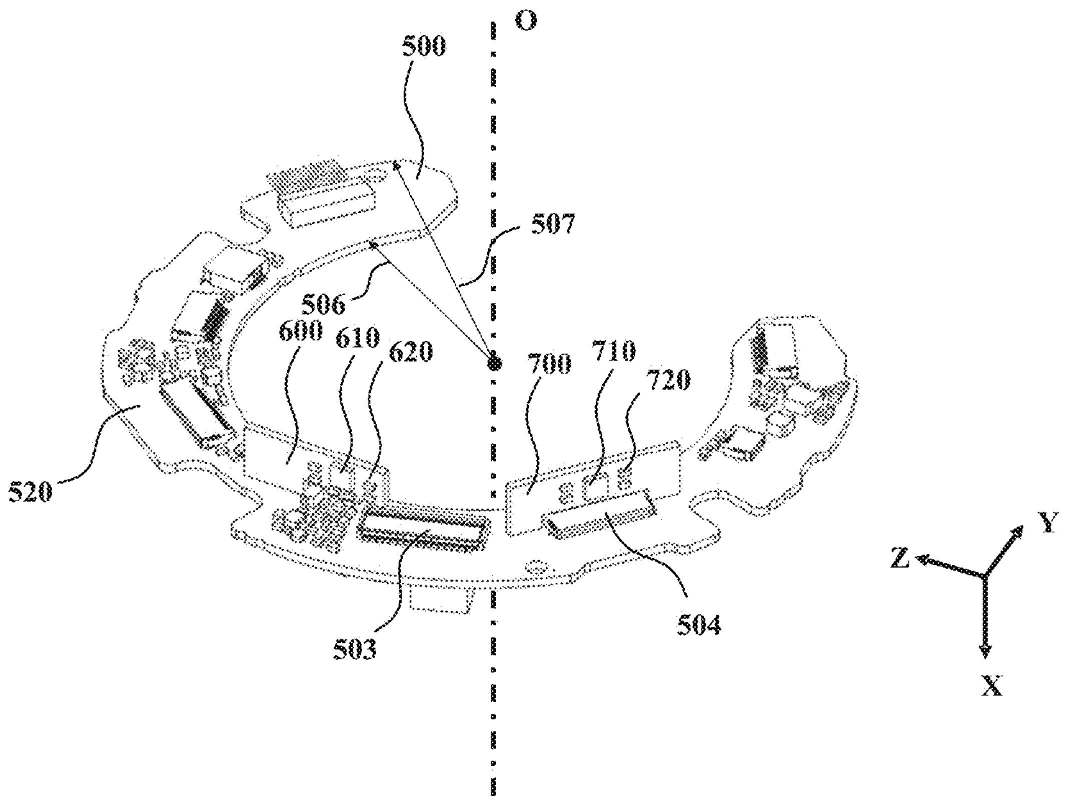
FIG. 9 is a perspective view illustrating a state in which the first substrate, the second substrate, and a third substrate are joined together in a second embodiment.

FIG. 9 is a perspective view illustrating a state in which the first substrate 500, the second substrate 600, and a third substrate 700 are joined together. The first substrate 500 is a substrate having a principal plane approximately orthogonal to the optical axis O. The first substrate 500 is a main substrate for controlling the image stabilizing drive unit 402, the aperture stop drive unit 202, the focus drive unit 302, and the like of the interchangeable lens 101. The first substrate 500 is provided with a microcomputer having basic control functions, drive ICs of various actuators, a connector for connection with another substrate in the interchangeable lens 101, and the like.

The connector (second electrical element) 503 is one of a plurality of connectors disposed on the first substrate 500 and serves as a connector with an unillustrated flexible printed circuit board. The flexible printed circuit board connected to the connector 503 is connected to the lens mount 102 illustrated in FIG. 4, which is connected to the camera body 1.

A connector (second electrical element) 504 is one of a plurality of connectors disposed on the first substrate 500 and serves as a connector with an unillustrated flexible printed circuit board. The flexible printed circuit board connected to the connector 504 is connected to the focus drive unit 302 illustrated in FIG. 2 and includes a wire through which a drive signal 730 for focus drive is transferred and a wire through which a detection signal 740 for focus position detection is transferred. The drive signal 730 is a noise source, and the detection signal 740 is potentially falsely detected due to influence of the drive signal 730 as a noise source. Thus, the wire of the drive signal 730 and the wire of the detection signal 740 may be disposed to avoid parallel extension. Details of the wires will be described later.

The first substrate 500 has an outer shape defined by the first substrate inner diameter 506 that is the inner diameter of the first substrate 500, and the first substrate outer diameter 507 that is the outer diameter (maximum outer diameter) of the first substrate 500. The first substrate inner diameter 506 and the first substrate outer diameter 507 share the same center corresponding to the optical axis O of a lens as an optical element, and the first substrate 500 has an arc shape.

The second substrate 600 is a substrate having a principal plane approximately parallel to the optical axis O. The second substrate 600 is a substrate orthogonally joined to the first substrate 500 and assists functions of the first substrate 500. Details of the second substrate 600 will be described later.

The electrical element (first electrical element) 610 is an image stabilizing drive IC configured to control the image stabilizing drive unit 402 illustrated in FIG. 2. An electrical element (first electrical element) 620 is a capacitor associated with the electrical element 610, performs noise removal for preventing false operation of the IC, and stores electrical charge to supply current with stable voltage to the IC.

The third substrate 700 is a substrate having a principal plane approximately parallel to the optical axis O. The third substrate 700 is a substrate orthogonally joined to the first substrate 500 and assists functions of the first substrate 500. Details of the third substrate 700 will be described later.

An electrical element 710 is a focus drive IC configured to control the focus drive unit 302 illustrated in FIG. 2. An electrical element 720 is a capacitor associated with the electrical element 710, performs noise removal for preventing false operation of the IC, and stores electrical charge to supply current with stable voltage to the IC.

The first substrate 500 is electrically connected to each of the second substrate 600 and the third substrate 700 through soldering. Unlike junction through a connector, the soldering can omit space that is occupied by the connector and necessary for mounting the connector. Thus, the size of the optical apparatus can be reduced. Moreover, unlike junction through a connector, the soldering can directly connect substrates and thus reduce contact resistance due to connection. As a result, voltage drop can be suppressed. However, this embodiment is not limited to this example, and the first substrate 500 may be joined to each of the second substrate 600 and the third substrate 700 with a conductive bonding agent.

Figure 10A:
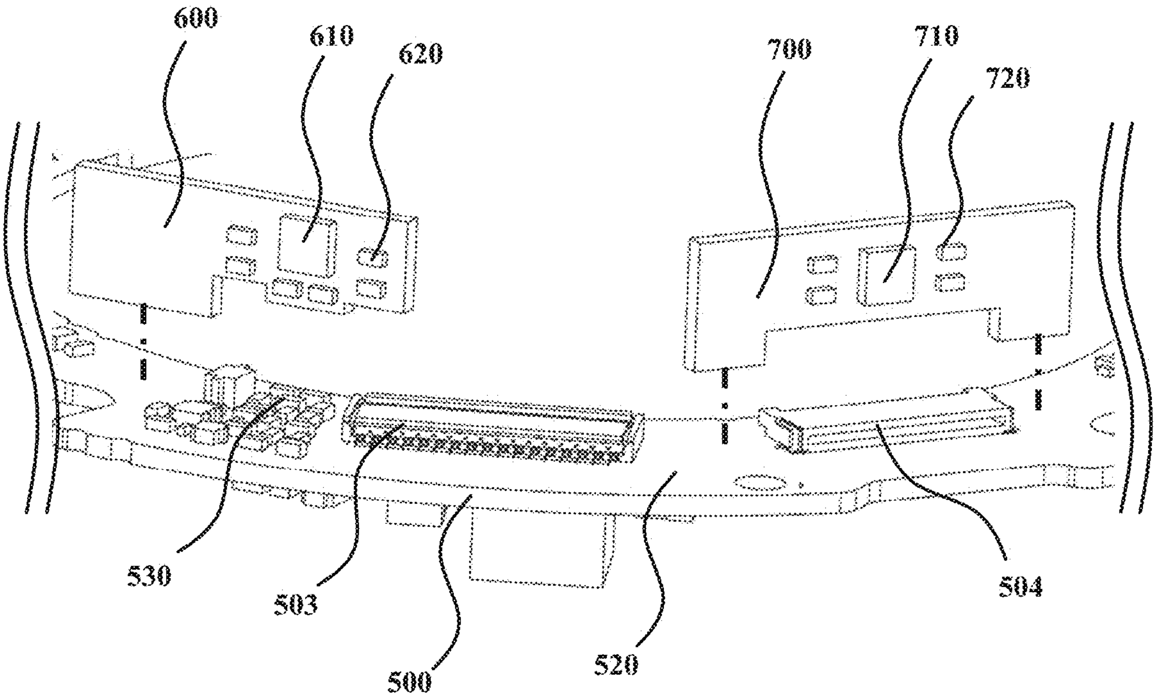
FIG. 10A is an exploded perspective view of the first substrate, the second substrate, and the third substrate in the second embodiment.
Figure 10B:
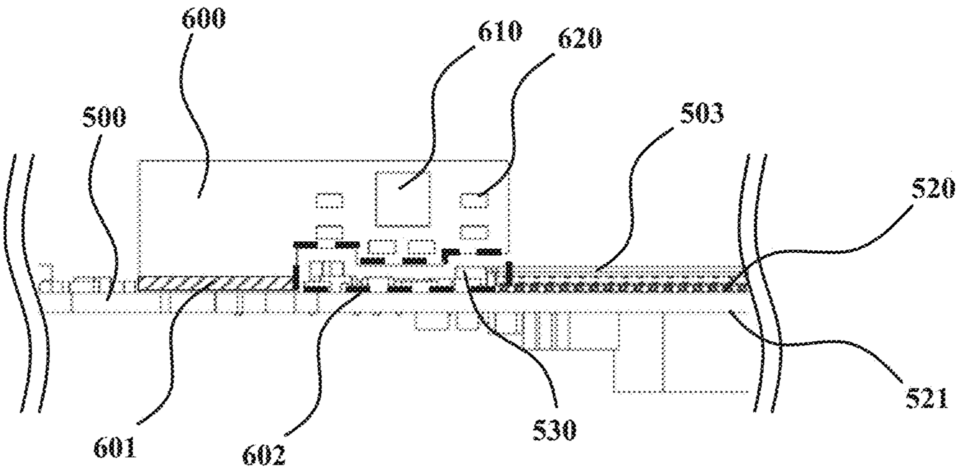
FIG. 10B illustrates a state in which the first substrate and the second substrate are joined together in the second embodiment.
Figure 10C:
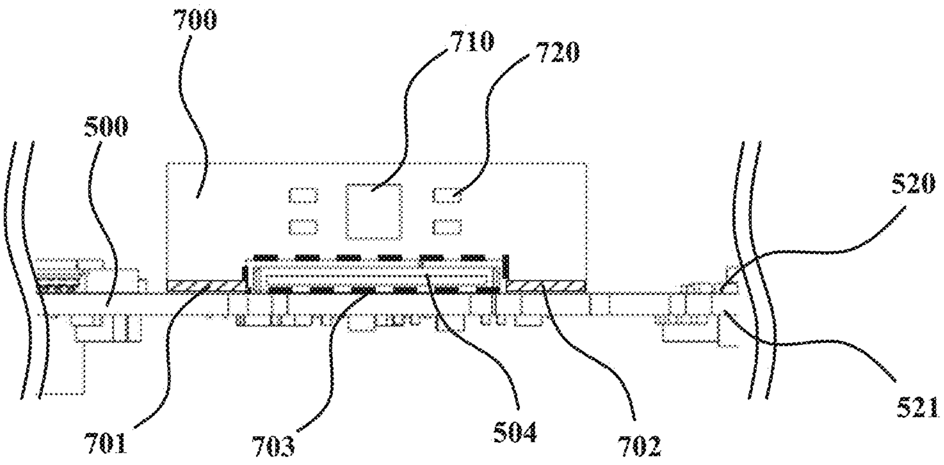
FIG. 10C illustrates a state in which the first substrate and the third substrate are joined together in the second embodiment.
Figure 10D:
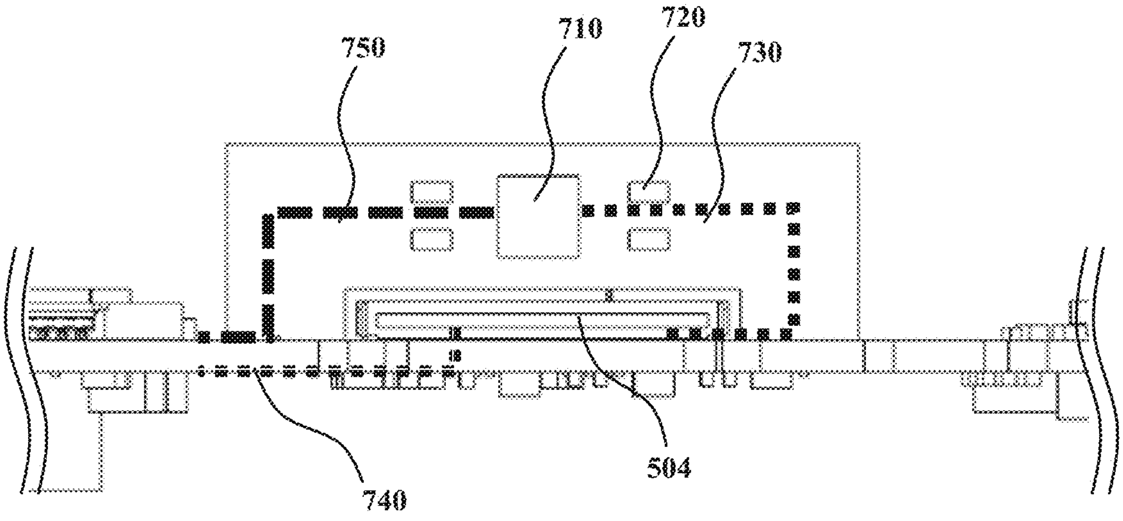
FIG. 10D illustrates wiring in a state in which the first substrate and the third substrate are joined together in the second embodiment.

FIG. 10A is an exploded perspective view of the first substrate 500, the second substrate 600, and the third substrate 700. FIG. 10B illustrates a state in which the first substrate 500 and the second substrate 600 are joined together when viewed from the electrical element mounting surface of the second substrate 600 (when viewed in the direction orthogonal to the optical axis O). FIG. 10C illustrates a state in which the first substrate 500 and the third substrate 700 are joined together when viewed from an electrical element mounting surface of the third substrate 700 (when viewed in the direction orthogonal to the optical axis O). FIG. 10D illustrates wiring in a state in which the first substrate 500 and the third substrate 700 are joined together.

A plurality of electrical elements are disposed on each of the first mounting surface 520 and the second mounting surface 521 of the first substrate 500. In this embodiment, the first mounting surface 520 is a surface on the image sensor side, and the second mounting surface 521 is the back surface of the first mounting surface 520 and a surface on the object side.

The second substrate 600 includes at least one joined portion 601 and a cutout portion 602 at a side joined to the first mounting surface 520 of the first substrate 500 (end portion facing the first mounting surface 520 of the first substrate 500). In other words, the end portion facing the first mounting surface 520 of the first substrate 500 includes the joined portion 601 joined to the first mounting surface 520, and the cutout portion 602 that forms space between the first mounting surface 520. The first substrate 500 and the second substrate 600 are joined together with soldering at the joined portion 601 where an insulating layer is opened and a conductor is exposed. As illustrated in FIG. 9, the joined portion 601 is disposed on each of front and back surfaces on the same surface side as the electrical element 610 of the second substrate 600 and a non-illustrated back surface side. For example, the joined portion 601 may be reinforced by a material different from solder, such as a bonding agent.

The cutout portion 602 of the second substrate 600 faces a plurality of electrical elements 530 as second electrical elements mounted on the first substrate 500 and the connector 503 and has a shape enclosing at least part of the electrical elements 530 while avoiding the electrical elements 530 on the first mounting surface 520. Gaps (spaces) are formed to avoid contact among the cutout portion 602, the electrical elements 530, and the connector 503, and the gaps may have the same size or different sizes for the shapes of the electrical elements 530 and the connector 503.

The cutout portion 602 may be provided at a side other than the side joined to the first mounting surface 520 of the first substrate 500. In this case, the cutout portion 602 may have a shape avoiding nearby lens barrel components and the like. The cutout portion 602 may be formed facing not only electrical elements, connectors, and lens barrel components but also wires, flexible substrates (flexible printed circuit boards), lead lines, and the like on the substrate.

The third substrate 700 includes a joined portion (first joined area) 701, a joined portion (second joined area) 702, and at least one cutout portion 703 at the side (end portion) joined to the first mounting surface 520 of the first substrate 500. The first substrate 500 and the third substrate 700 are joined together with soldering at the joined portions 701 and 702 where an insulating layer is opened and a conductor is exposed. As illustrated in FIG. 9, the joined portion 701 is disposed on each of front and back surfaces on the same surface side as the electrical element 710 of the third substrate 700 and a non-illustrated back surface side. The joined portions 701 and 702 may be reinforced by a material different from solder, such as a bonding agent. In this embodiment, the two joined portions 701 and 702 (two places) are provided as joined portions of the third substrate 700 to the first substrate 500, but three joined portions (three places) or more such as the front and back sides of the third substrate 700 or different positions may be provided. In a case where two joined portions or more are provided, the freedom of the position of a wire connecting the first substrate 500 and the third substrate 700 increases and the freedom of wiring on the substrate improves.

The cutout portion 703 of the third substrate 700 has a shape enclosing the connector 504 mounted on the first substrate 500. More specifically, on the first substrate 500, the connector 504 is disposed at a position facing the cutout portion 703 of the third substrate 700. The joined portions 701 and 702 are disposed on opposite sides with the connector 504 in between in a direction orthogonal to the insertion-removal direction of a flexible printed circuit board. Gaps (spaces) are formed to avoid contact between the cutout portion 602 and the connector 504. The cutout portion 703 may be provided at a side other than the side joined to the first mounting surface 520 of the first substrate 500.

The third substrate 700 is disposed above the connector 504, and the joined portions 701 and 702 are disposed on respective sides of the connector 504. More specifically, the joined portions 701 and 702 are disposed on opposite sides in proximity to the connector 504 with the connector 504 in between in a direction approximately orthogonal to the insertion-removal direction (optical axis direction) of a flexible printed circuit board. Typically, the drive signal 730 of a non-illustrated flexible printed circuit board is a noise source, and thus may be connected to the electrical element 710 at a short distance after connection to the connector 504. A control signal 750 is wired from the electrical element 710 and connected to the lens control unit 104.

As illustrated in FIG. 10D, the drive signal 730 of a non-illustrated flexible printed circuit board and the detection signal 740 are wired (transferred) to the first substrate 500 through the connector 504. Thereafter, the drive signal 730 is wired (transferred) to the third substrate 700 and connected to the electrical element 710.

Typically, the drive signal 730 needs to be wired short. Thus, the electrical element 710 is disposed on the second mounting surface 521, which is a surface opposite the first mounting surface 520 on which the connector 504 is mounted. In this structure, the drive signal 730 is wired from a surface layer of the first substrate 500 to a surface layer on the opposite side through inner layers and thus needs to avoid parallel extension with the detection signal 740 at each layer, which decreases the freedom of wiring.

However, in this embodiment, the drive signal 730 is wired (transferred) only to the first mounting surface 520 of the first substrate 500 and then wired (transferred) to the third substrate 700. Thus, wiring to the inner layers of the first substrate 500 is unnecessary in an area near the connector 504. As a result, care for signal noise such as parallel extension is unnecessary at the inner layers of the first substrate 500, which improves the freedom of wiring and enables space saving of substrate wiring.

Figure 11:
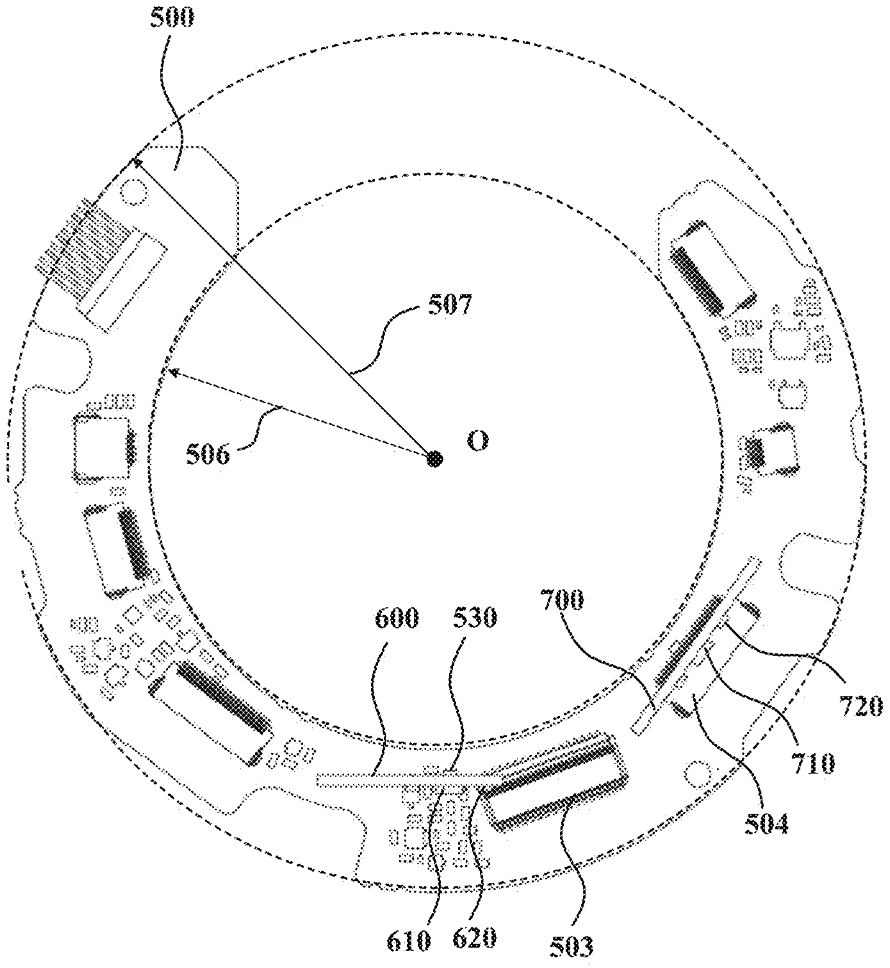
FIG. 11 illustrates a state in which the first substrate, the second substrate, and the third substrate are joined together in the second embodiment.

FIG. 11 illustrates a state in which the first substrate 500, the second substrate 600, and the third substrate 700 are joined together in this embodiment when viewed from the first mounting surface 520 of the first substrate 500 (when viewed in the optical axis direction).

Conventionally, in each mounting surface of the first substrate 500, the electrical elements 530, connectors, and the like mounted on the first substrate 500 cannot be disposed so that they overlap each other when viewed in the optical axis direction due to junction of the electrical elements to the substrate.

On the other hand, according to this embodiment, in areas other than the joined portions 601, 701, and 702, the second substrate 600 and the third substrate 700 can be disposed so that they overlap the electrical elements 530, the connector 503, the connector 504, and the like on the first substrate 500 when viewed in the optical axis direction. This structure enables high density mounting of disposing other electrical elements on mounting surfaces orthogonal to the electrical elements 530 on the first substrate 500. As a result, efficient disposition in space inside the lens barrel of the interchangeable lens 101 can be achieved by disposing the second substrate 600 or the third substrate 700 in space above the component disposition space.

Figure 12A:
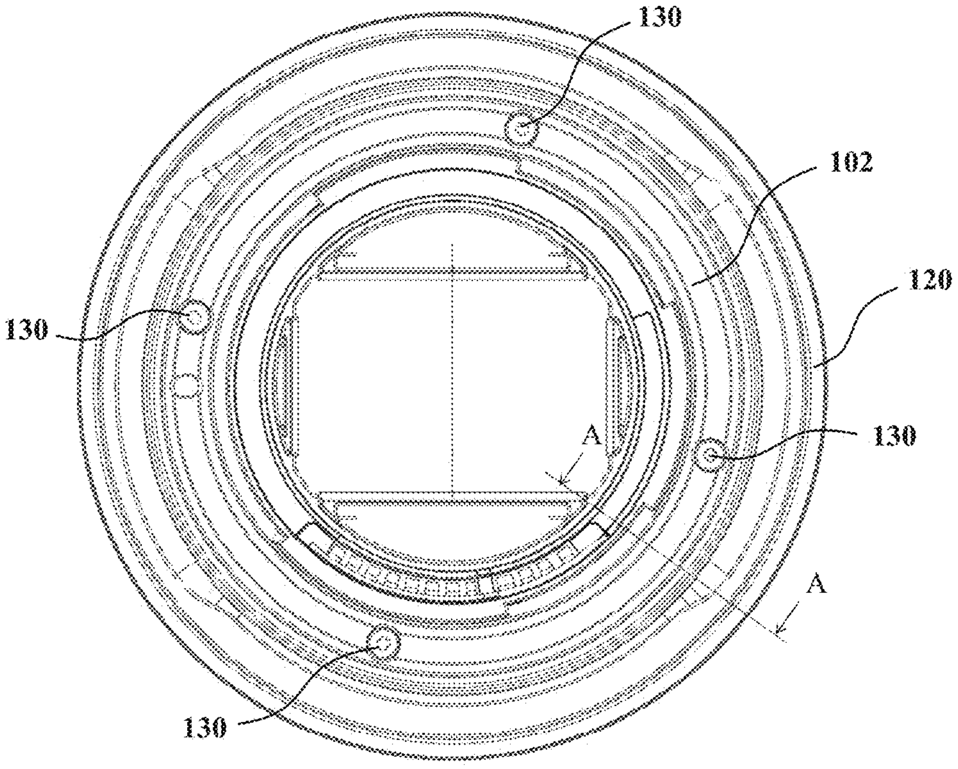
FIG. 12A is a back view of an interchangeable lens according to the second embodiment.
Figure 12B:
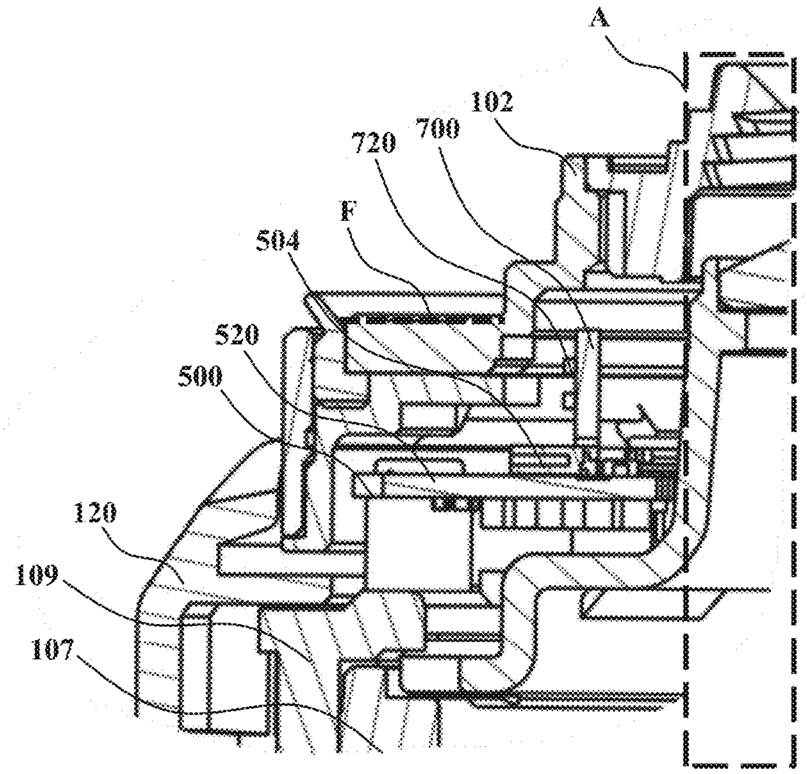
FIG. 12B is a sectional view of the interchangeable lens according to the second embodiment.
Figure 13:
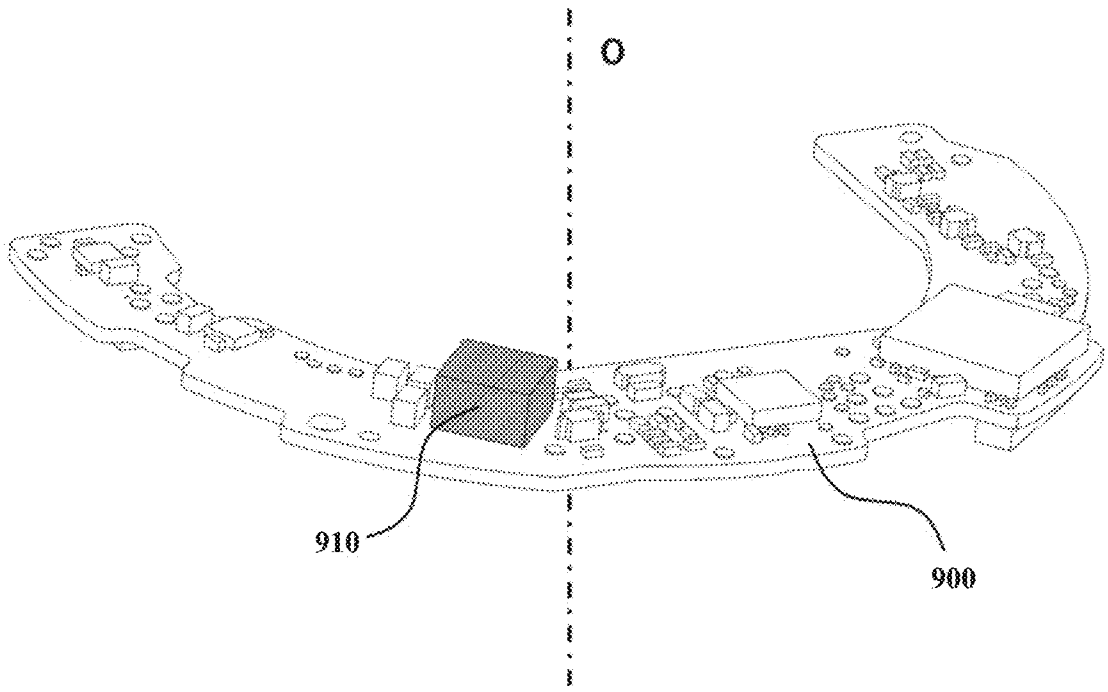
FIG. 13 is a perspective view of a substrate in an optical apparatus according to a comparative example.

FIG. 12A is a back view of the interchangeable lens 101 on which the substrates of this embodiment are mounted. FIG. 12B is a sectional view taken along a line A-A in FIG. 12A. FIG. 12A illustrates the interchangeable lens 101 viewed from the imaging surface side and illustrating the arrangement of the lens mount 102. FIG. 12B illustrates an arrangement state of the first substrate 500 and the third substrate 700 in the interchangeable lens 101.

The lens mount 102 is fixed to the exterior ring 120 that is an exterior portion of the interchangeable lens 101 by the screw 130. The first substrate 500 is disposed directly below the lens mount 102 based on consideration of connection with the camera body 1. Due to this structure, the third substrate 700 is disposed between the first mounting surface 520 of the first substrate 500 and the lens mount 102.

A mount surface F is a surface that is orthogonal to the optical axis O and contacts the camera mount 7. In the interchangeable lens 101, the imaging optical system is formed in an optical path area A. As an example, a portion close to the optical axis side of the mount surface F includes an area that is not used as an optical path. The conventional structure needs to have a large size to avoid interference with the lens barrel inside in arranging the electrical elements 530, connectors, and the like. On the other hand, the arrangement according to this embodiment can provide the favorable shapes of lens barrel components and excellent spatial efficiency of substrate disposition. Thus, the structure according to this embodiment can achieve substrate disposition by maximizing space between the lens mount 102 and the first substrate 500.

In this embodiment, at least one of the second substrate 600 and the third substrate 700 is mounted on the first substrate 500. This structure enables high density mounting without excessively reducing the component disposition space on the first substrate 500 and achieves efficient disposition in space above the component disposition space and space inside the lens barrel. Moreover, since the drive signal 730 is wired (transferred) to the third substrate 700, influence of noise can be reduced by avoiding parallel extension with the detection signal 740 while reducing a wiring area on the first substrate 500.

The first substrate 500 has an arc shape in this embodiment but may have a rectangular shape or another shape in which, for example, the first substrate inner diameter 506 or the first substrate outer diameter 507 is partially straight. In a case where the first substrate 500 has a rectangular shape, the first substrate 500 may be disposed in the fixed barrel 109 or the like instead of directly below the lens mount 102.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each embodiment can provide an optical apparatus that has a reduced size.

This application claims priority to Japanese Patent Application No. 2023-149865, which was filed on Sep. 15, 2023, and Japanese Patent Application No. 2023-154051, which was filed on Sep. 21, 2023, each of which is hereby incorporated by reference herein in its entirety.

What is claimed is:

1. An optical apparatus comprising:

a first substrate having a principal plane orthogonal to an optical axis; and a second substrate having a principal plane parallel to the optical axis, wherein the first substrate and the second substrate are joined together, wherein the first substrate has a first mounting surface, and a second mounting surface opposite to the first mounting surface, wherein the second substrate includes a joined portion joined to the first mounting surface of the first substrate, and a first area extending across the first mounting surface and the second mounting surface in an optical axis direction, wherein the optical apparatus further comprises a first electrical element disposed in the first area and a second electrical element disposed in the second area of the second substrate or in an area overlapping the first substrate in a direction orthogonal to the optical axis, and wherein the second substrate includes a second area intersecting an end portion of the first substrate in the direction orthogonal to the optical axis.

2. The optical apparatus according to claim 1, further comprising a mount unit connectable to an image pickup apparatus, wherein the joined portion of the second substrate is disposed between the first mounting surface of the first substrate and the mount unit.

3. The optical apparatus according to claim 1, wherein at least part of the first electrical element is disposed at a position farther from the optical axis than a maximum outer diameter of the first substrate, when viewed in the optical axis direction.

4. The optical apparatus according to claim 1, wherein a connector is disposed on the first mounting surface of the first substrate, and wherein the principal plane of the second substrate is parallel to a longitudinal direction of the connector in a direction orthogonal to the optical axis.

5. The optical apparatus according to claim 1, wherein the first substrate and the second substrate are joined together with soldering.

6. The optical apparatus according to claim 1, wherein in the optical axis direction, the second substrate includes the first area protruding from the second mounting surface of the first substrate, and a second area protruding from the first mounting surface of the first substrate, wherein when viewed in the optical axis direction, the first and second areas of the second substrate are disposed between a minimum inner diameter and a maximum outer diameter of the first substrate, wherein when viewed in the optical axis direction, at least part of the first electrical element protrudes outward from the maximum outer diameter of the first substrate, and wherein when viewed in the optical axis direction, the first area of the second substrate extends in an area of the first substrate with an outer diameter smaller than the maximum outer diameter.

7. The optical apparatus according to claim 1, wherein the optical apparatus is a lens apparatus.

8. An optical apparatus comprising:

a first substrate having a principal plane orthogonal to an optical axis; and a second substrate having a principal plane parallel to the optical axis, wherein the first substrate and the second substrate are joined together, wherein the first substrate has a first mounting surface, and a second mounting surface opposite to the first mounting surface, wherein the second substrate includes a joined portion joined to the first mounting surface of the first substrate, and a first area extending across the first mounting surface and the second mounting surface in an optical axis direction, wherein the optical apparatus further comprises a first electrical element disposed in the first area, and wherein the first electrical element is disposed so that the first electrical element does not overlap the first substrate in the optical axis direction.

9. An optical apparatus comprising:

a first substrate having a principal plane orthogonal to an optical axis; and a second substrate having a principal plane parallel to the optical axis, wherein the first substrate and the second substrate are joined together, wherein the first substrate has a first mounting surface, and a second mounting surface opposite the first mounting surface, wherein the second substrate includes an end portion facing the first mounting surface of the first substrate, wherein the end portion includes a joined portion joined to the first mounting surface, and a cutout portion that forms space with the first mounting surface, wherein, on the first substrate, a second electrical element is disposed at a position facing the cutout portion of the second substrate.

10. The optical apparatus according to claim 9, further comprising a first electrical element disposed on the second substrate.

11. The optical apparatus according to claim 9, wherein at least part of the second electrical element is disposed in the space formed by the cutout portion such that the second electrical element does not contact the second substrate.

12. The optical apparatus according to claim 11, wherein the second electrical element is a connector for connection with a flexible printed circuit board.

13. The optical apparatus according to claim 12, wherein the joined portion includes a first joined area and a second joined area that are disposed on opposite sides with respect to the second electrical element in a direction orthogonal to an insertion-removal direction of a flexible printed circuit board.

14. The optical apparatus according to claim 9, wherein the first substrate and the second substrate are joined together with soldering.

15. The optical apparatus according to claim 9, wherein the first substrate and the second substrate are joined together with a conductive bonding agent.

16. The optical apparatus according to claim 9, further comprising a mount unit connectable to an image pickup apparatus, wherein the joined portion of the second substrate is disposed between the first mounting surface of the first substrate and the mount unit.

17. The optical apparatus according to claim 9, wherein the optical apparatus is a lens apparatus.

18. An optical apparatus comprising:

a first substrate having a principal plane orthogonal to an optical axis; and a second substrate having a principal plane parallel to the optical axis, wherein the first substrate and the second substrate are joined together, wherein the first substrate has a first mounting surface, and a second mounting surface opposite the first mounting surface, wherein the second substrate includes an end portion facing the first mounting surface of the first substrate, wherein the end portion includes a joined portion joined to the first mounting surface, and a cutout portion that forms space with the first mounting surface, and wherein at least part of the second substrate overlaps a second electrical element mounted on the first substrate, when viewed in an optical axis direction.

* * * * *